United States Patent [19]

Newman, Jr.

[11] Patent Number: 5,224,029

[45] Date of Patent: Jun. 29, 1993

[54] POWER FACTOR AND HARMONIC CORRECTION CIRCUIT INCLUDING AC STARTUP CIRCUIT

[76] Inventor: Robert C. Newman, Jr., 2955 Main Rd. East, Emmaus, Pa. 18049

[21] Appl. No.: 745,817

[22] Filed: Aug. 16, 1991

[51] Int. Cl.⁵ .............................. H02M 1/12; H02J 3/1
[52] U.S. Cl. ........................................ 363/48; 323/205; 323/208; 323/901; 333/175; 307/105; 361/113; 363/49
[58] Field of Search .................. 307/102, 103, 105; 323/205–211, 901, 908; 322/58; 361/111, 113; 333/175, 176, 181; 363/39, 40, 44, 45, 47, 48, 49

[56] References Cited

U.S. PATENT DOCUMENTS

| | | | |
|---|---|---|---|
| 2,134,522 | 10/1938 | Lee | 333/174 X |
| 3,908,159 | 9/1975 | Griffey | 363/54 |
| 4,222,096 | 9/1980 | Capewell | 363/44 |
| 4,369,490 | 1/1983 | Blum | 363/48 |
| 4,453,145 | 6/1984 | Schuster | 333/174 |
| 4,539,617 | 9/1985 | Delaney et al. | 361/113 X |
| 4,672,522 | 6/1987 | Lesea | 363/48 |
| 4,937,719 | 6/1990 | Yamada et al. | 363/47 X |
| 5,051,685 | 9/1991 | Sink | 323/208 |
| 5,148,359 | 9/1992 | Nguyen | 363/48 |
| 5,148,360 | 9/1992 | Nguyen | 363/48 |

OTHER PUBLICATIONS

A. R. Prasad et al., "A Novel Passive Waveshaping Method for Single-Phase Diode Rectifiers", *IEEE Transactions on Industrial Electronics*, vol. 37, No. 6 (Dec. 1990).

Primary Examiner—Todd E. DeBoer
Assistant Examiner—Fritz M. Fleming
Attorney, Agent, or Firm—Seidel, Gonda, Lavorgna & Monaco

[57] ABSTRACT

A circuit for correcting power factor and for reducing ac line current harmonic components in conjunction with bridge-connected capacitive-filtered loads and for providing a source of ac startup current for associated circuitry, for example a switch mode power supply which may form part of the load. The circuit comprises a rectifier bridge, a dual-tuned circuit having a tuned filter in series between an ac line input and the bridge, and a shunt capacitor across the input to the bridge. The tuned filter comprises a parallel connected inductor and capacitor, the shunt capacitor being tuned with the inductor to form a trap filter to reduce third-order and higher harmonic components in the ac line current. The circuit also includes a current source operatively connected to the shunt capacitor for providing a source of ac current immediately upon application of ac power to the ac line input.

18 Claims, 4 Drawing Sheets

POWER FACTOR AND HARMONIC CORRECTION CIRCUIT INCLUDING AC STARTUP CIRCUIT

FIELD OF THE INVENTION

The present invention relates to power supply circuits, and in particular relates to a passive circuit which corrects line current harmonics and power factor and provides startup power for associated circuitry, such as control circuitry for a switch-mode power supply.

BACKGROUND OF THE INVENTION

Conversion of ac power (such as from ac lines from utilities or generators and alternators) to dc power has typically been done by using a diode bridge rectifier and a filter capacitor connected across the rectifier output in parallel with a load. A typical single-phase ac-to-dc diode bridge rectifier circuit is shown in FIG. 1. In FIG. 1, the rectifier 10 is fed by a single-phase ac line input 12 which is connected across the ac input terminals of a diode bridge 14. The rectified dc output from diode bridge 14 is fed to a load, modeled in FIG. 1 as a resistor $R_L$. A filter capacitor $C_o$ is connected across the load to smooth the dc current to the load. Parasitic line inductance associated with this type of circuit is shown as a lumped inductor $L_i$.

The circuit shown in FIG. 1 has the disadvantage of generating pulsed ac line currents drawn from the ac lines. The non-ideal character of the input currents from the ac lines creates several problems for the power distribution network and for other apparatus in the vicinity of the rectifier. Among the problems are high input-current harmonic components, low rectifier efficiency because of the large rms value of the input current, input ac line voltage distortion because of the associated peak currents, and a maximum input power factor much, much less than unity (e.g., 0.5 to 0.75), due primarily to the presence of a third harmonic component of the ac frequency of considerable amplitude.

A modified rectifier circuit to increase power factor and reduce harmonics has been proposed as shown in FIG. 2. In FIG. 2, rectifier circuit 16 is fed by a single-phase ac line input 18 which is connected across the ac input terminals of a diode bridge 20. The rectified dc output from diode bridge 20 is fed to a load, modeled in FIG. 2 as a resistor $R_L$. A filter capacitor $C_o$ is connected across the load to smooth the dc current to the load. An input filter circuit 22 is located in series with one leg of the ac line input 18. Input filter circuit 22 consists of an inductor $L_r$ and a capacitor $C_r$ connected in parallel.

The circuit shown in FIG. 2 is stated to have advantages over the circuit of FIG. 1. Input peak current is said to be lower, reducing input voltage distortion. Power factor is said to be increased somewhat, to 0.887. Efficiency is said to be increased because of the low rms values of the input current. However, the circuit of FIG. 2 is admittedly more complex in operation than the circuit of FIG. 1.

Other proposed solutions to improve power factor and reduce line current harmonics have taken the approach of using passive circuits to correct line current harmonics and separate passive circuits to increase power factor, but this approach has not yielded acceptable performance levels. Still other proposed solutions have taken the form of active circuits. These active circuits do work well, but require a large number of components, and are not very rugged in terms of line transient susceptibility and damage from overload or short circuit.

The present invention overcomes the drawbacks of the prior solutions, and uses a passive circuit which reduces line current harmonics and increases power factor using only three passive components. The circuit can be tuned to reduce total line current harmonics or total harmonic distortion (THD) to below 5%, while increasing power factor to greater than 0.95. The present invention also provides start up power for other circuitry, such as a switch-mode power supply which may form part of the load $R_L$, without the need for additional active or passive components. The present invention significantly increases power factor, reduces THD, is rugged and reliable, and is simple and inexpensive to construct.

Other objects and advantages of the invention will appear hereinafter.

SUMMARY OF THE INVENTION

The present invention is a circuit for correcting power factor and reducing ac line current harmonics in conjunction with bridge-connected capacitive-filtered loads and for providing a source of ac startup current for associated circuitry, for example a switch-mode power supply which may form part of the load. The circuit comprises a rectifier bridge, a dual-tuned circuit having a tuned filter means in series between an ac line input and the bridge, and a shunt capacitor across the input to the bridge. The tuned filter comprises a parallel-connected inductor and capacitor, the shunt capacitor being tuned with the inductor to form a trap filter means to reduce third-order and higher harmonics in the ac line current. The circuit also includes current source means operatively connected to the shunt capacitor for providing a source of ac startup current immediately upon application of ac power to the ac line input.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
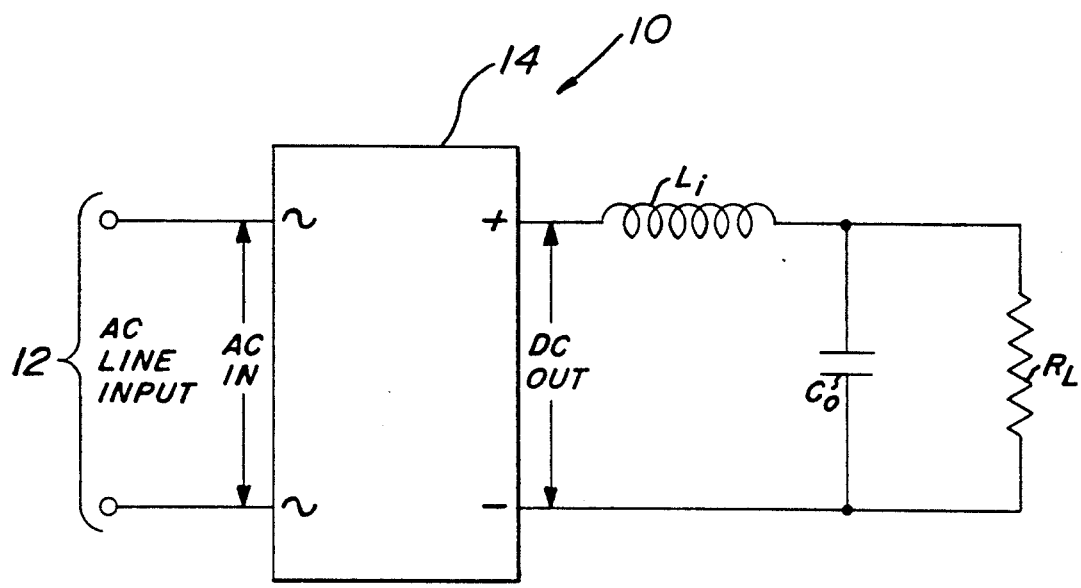
FIG. 1 is a simplified schematic diagram of a rectifier circuit according to the prior art.
Figure 2:
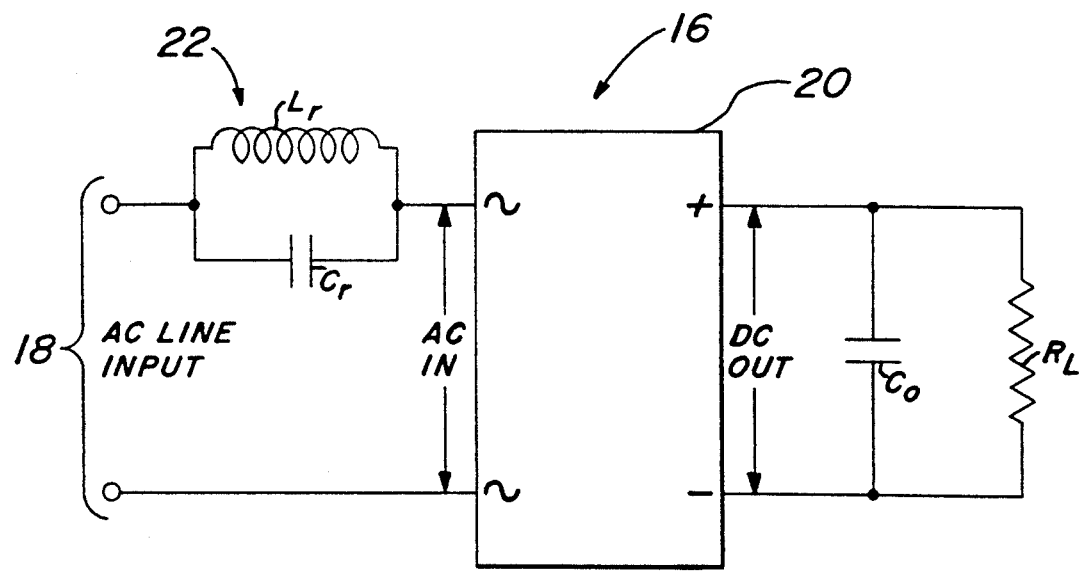
FIG. 2 is a simplified schematic diagram of a different rectifier circuit according to the prior art.
Figure 3:
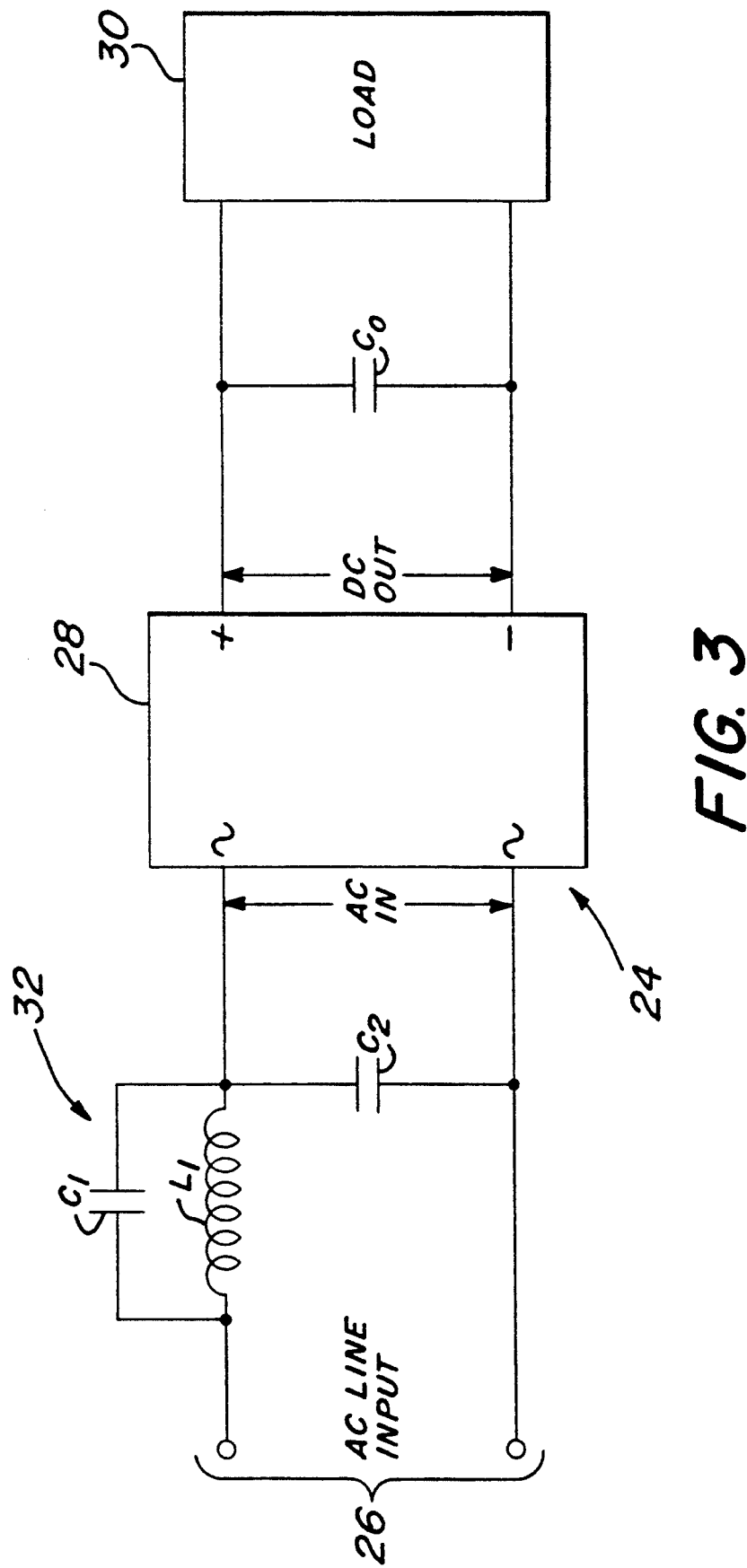
FIG. 3 is a simplified schematic diagram of the present invention.

Referring now to the drawings, wherein like numerals indicate like elements, there is shown in FIG. 3 a circuit 24 in accordance with the present invention. Circuit 24 comprises a pair of ac line inputs 26 for connecting circuit 24 to a source of single-phase ac power, such as a generator or alternator, or such as ac mains from a distribution system. Circuit 24 comprises a conventional diode bridge 28 to rectify ac input current to dc output current. The dc output of bridge 28 supplies a load 30, which for the present may be considered to be any circuit or device that consumes power, and may be resistive, reactive or both. A filter capacitor $C_o$ is connected across the dc output of bridge 28 in parallel with load 30 to smooth out ripples in the dc output current from the bridge, in known manner.

In one leg of the ac line inputs 26 there is located a tuned filter means 32. Tuned filter means 32 comprises a capacitor $C_1$ connected in parallel with an inductor $L_1$. Inductor $L_1$ provides power factor correction for the bridge-coupled capacitive load comprising both filter capacitor $C_o$ and load 30. Preferably, but not necessarily, the impedance of the inductor is approximately 0.125 times the impedance of the bridge-coupled capacitive load at the frequency of operation, i.e., at the ac line frequency.

Capacitor $C_1$ and inductor $L_1$ are tuned to form a trap filter to reduce third harmonic components of the ac line frequency. Preferably, but not necessarily, $C_1$ and $L_1$ are tuned to approximately 1.2 times the third harmonic of the line frequency. At this trap frequency, sufficient damping of the third harmonic is achieved and higher order harmonics are more effectively damped.

A second capacitor $C_2$ is connected across the ac input terminals of bridge 28. Shunt capacitor $C_2$ and inductor $L_1$ together form a second trap filter for reducing higher order (i.e., greater than third order) harmonics. By tuning capacitor $C_2$ with inductor $L_1$, higher order harmonics can be significantly reduced.

Those skilled in the art will appreciate that, by tuning components $L_1$, $C_1$ and $C_2$, power factor and harmonics can be controlled. By properly tuning these components, total line current harmonics (THD) can be reduced to below 5%, while power factor can be increased to greater than 0.95. Thus, it will be appreciated that the present invention offers significant improvements over prior rectifier circuits which exhibit much lower power factors and greater THD.

Those skilled in the art will also appreciate that the circuit of the present invention is useful in any bridge-coupled capacitively-filtered power supply circuit. This includes any type of circuit which requires a dc bus derived from an ac power line.

One type of power supply circuit in which the circuit of the present invention is especially useful is a switch-mode power supply. As those skilled in the art will understand, a switch-mode power supply converts ac power at a line frequency to rectified dc power which in turn is converted to ac power, usually at a frequency much higher than the ac line input frequency. A switch-mode power supply typically employs a plurality of switching devices which are operated by switch control signals generated by control circuitry. When used with a switch-mode power supply, capacitor C2 provides a source of ac current which can be applied to the control circuitry of the switch-mode power supply to start up the power supply.

Figure 4:
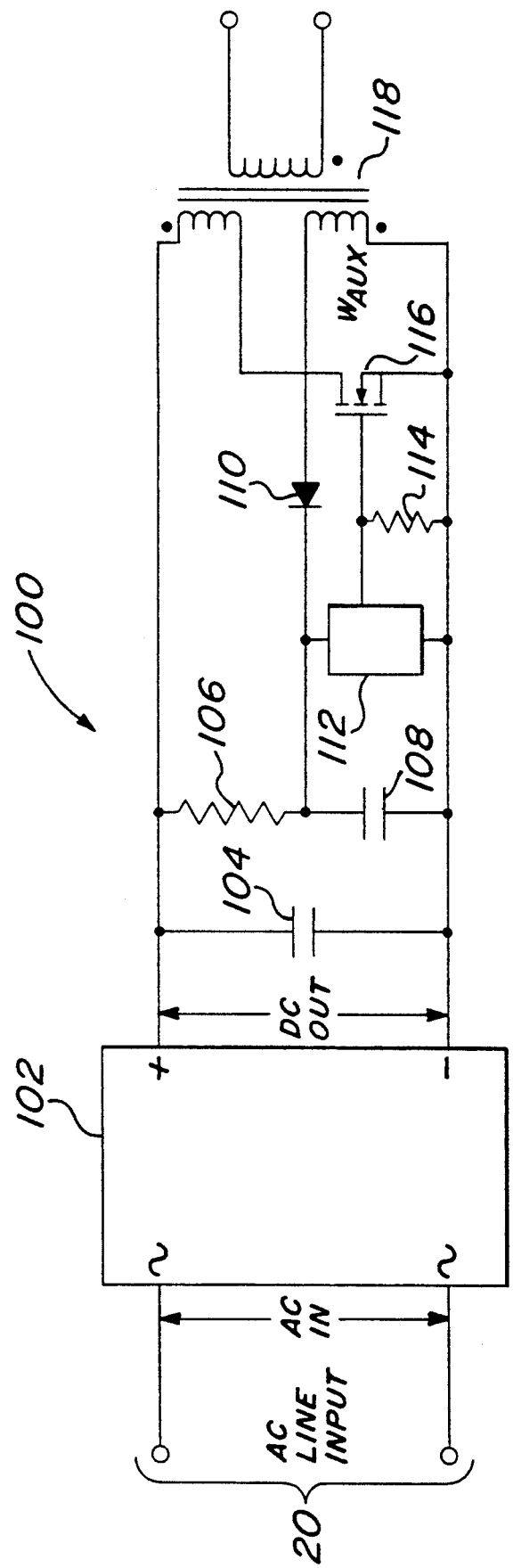
FIG. 4 is a simplified schematic diagram of a prior art switch mode power supply with startup circuitry.

All switch-mode power supplies require some sort of startup circuitry to get the power supply running when power is first applied from the ac line. As shown in FIG. 4, which is based on a diagram on page 222 of the Unitrode Applications Handbook 1987-1988, a typical switch-mode power supply may consist of a bridge rectifier 102 connected to ac line input terminals 120. The dc output of bridge rectifier 102 is connected to filter capacitor 104. Integrated circuit oscillator 112 controls the switching of transistor switch 116 which is coupled to a primary winding of output transformer 118. Integrated circuit 112 can be a Unitrode integrated circuit type UC 3842.

When power is first applied to ac line input terminals 120, storage capacitor 108 is charged up through power resistor 106 and provides power to integrated circuit 112. After the power supply has started, a voltage is developed across auxiliary winding $W_{aux}$ of output transformer 118 and thus provides power to integrated circuit 112 via steering diode 110. This saves on total power dissipated in the converter because the auxiliary winding can be sized exactly for the control circuitry being powered. Because most control circuitry operates on relatively low voltage (10-40 volts), and because the input voltages are in the range of 100-300 Vac, a substantial amount of power (1-2 watts) will be dissipated in the start up power resistor if it is not disconnected after the circuit begins running. To disconnect the startup power resistor, additional circuitry is required. From the standpoint of cost, reliability and space (i.e., component volume), it would be desirable not to have this added circuitry.

The present invention makes it possible to eliminate a start up power resistor and, consequently, other circuitry for disconnecting the start up resistor after the system is running.

Figure 5:
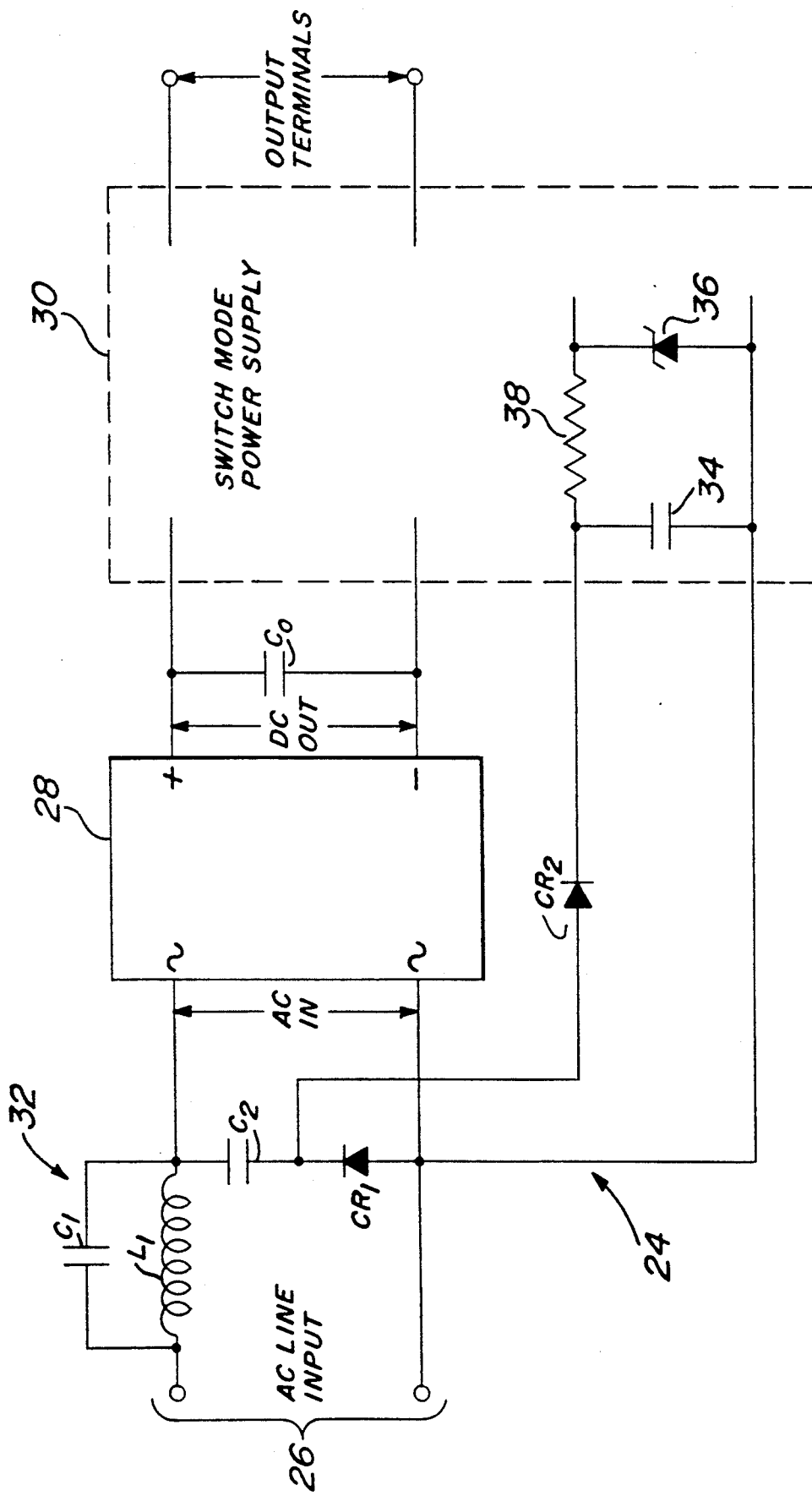
FIG. 5 is a simplified schematic diagram of the present invention, shown in slightly greater detail.

Referring now to FIG. 5, the present invention is shown in somewhat greater detail than in FIG. 3, and the start up feature of the invention is more clearly illustrated. In FIG. 5, the same reference numerals and designations indicate the same parts as in FIG. 3, and therefore those parts need not be described again. With the circuit as shown in FIG. 5, as soon as power is applied to the circuit 24 of the invention, an ac circulating current begins to flow through capacitor $C_2$. A pair of steering diodes $CR_1$ and $CR_2$ are connected anti-parallel and are located in series with shunt capacitor $C_2$ to steer this current through a capacitor 34 in the switch-mode power supply, which forms part of load 30, as described above. This circulating current charges capacitor 34 up to the low voltage bus defined by Zener diode 36. When capacitor 34 is charged to the level of the low voltage bus, current will begin to flow through resistor 38 which is not a power resistor to the low voltage control circuitry of the switch-mode power supply (such as the supply terminal of integrated circuit 112 in FIG. 4), and will start up the switch-mode supply.

Since the circulating current used to start up the switch mode power supply is derived without the use of resistors, there is almost no power loss incurred by harnessing this current. This novel circuit therefore eliminates the need for a power resistor and active components needed to disconnect it after the circuit begins to run. This, in turn, yields a circuit which is smaller, less expensive, more reliable, and more efficient.

The present invention may be embodied in other specific forms without departing from the spirit or essential attributes thereof and, accordingly, reference should be made to the appended claims, rather than to the foregoing specification, as indicating the scope of the invention.

I claim:

1. A circuit for correcting power factor and reducing ac line current harmonic components in conjunction with bridge-connected capacitive-filtered loads and for providing a source of ac startup current for associated circuitry, comprising a rectifier bridge, a dual-tuned circuit having a tuned filter means in series between an ac line input and the bridge, a shunt capacitor across the input to the bridge, the tuned filter comprising a parallel-connected inductor and capacitor, the tuned filter being tuned to approximately the third order harmonic component in the ac line current, the shunt capacitor being tuned with the inductor of said tuned filter to form a trap filter means to reduce harmonic components in the ac line current higher than third-order components, and current source means operatively connected to the shunt capacitor for providing a source of ac current immediately upon application of ac power to the ac line input.

2. In a bridge-connected power supply circuit for supplying power to a capacitive-filtered load through a rectifier bridge, the bridge having a pair of ac input terminals for receiving power from ac lines and a pair of output terminals for supplying rectified current to the capacitive-filtered load, apparatus for correcting the power factor of the circuit and for reducing the harmonic current components in the line current, comprising ac shunt means across the bridge ac input terminals, passive low-pass filter means in series with one of the bridge ac input terminals and located between the ac lines and the ac shunt means, the low-pass filter means being tuned to approximately 1.2 times the third harmonic of the ac line frequency, and the shunt means and low-pass filter means being tuned together to reduce harmonic components above the third harmonic in the line current.

3. Apparatus according to claim 2, wherein the low-pass filter means comprises a parallel LC trap circuit.

4. Apparatus according to claim 3, wherein the trap circuit inductor has an impedance at the fundamental ac line frequency equal to approximately 0.125 times the impedance of the load.

5. Apparatus according to claim 2, wherein the ac shunt means comprises a capacitor.

6. Apparatus according to claim 2, wherein the low-pass filter means includes an inductor having an impedance at the fundamental ac line frequency equal to approximately 0.125 times the impedance of the load.

7. Apparatus according to claim 2, further comprising current source means operatively connected to the ac shunt means for providing a source of ac current when the ac lines are energized by ac power.

8. Apparatus according to claim 7, wherein the current source means comprises a pair of anti-parallel diodes in series with the ac shunt means.

9. Apparatus for simultaneously correcting power factor and reducing line current harmonic components in power supply circuits having a capacitive-filtered load supplied by at least two ac input lines through a ridge rectifier, comprising a power factor correction element in series with one of the ac input lines to the bridge rectifier, a tuning element operatively connected to the power factor correction element for forming therewith a first trap means for reducing primarily third order components of the ac line current, and ac shunt means across the inputs to the bridge rectifier and operatively connected with the power factor correction element and the tuning element for forming therewith a second trap means for reducing harmonic components of the ac line current higher than third-order components.

10. Apparatus according to claim 9, wherein the power factor correction element comprises an inductor.

11. Apparatus according to claim 10, wherein the impedance of the inductor at the fundamental ac line frequency is approximately 0.125 times the load impedance.

12. Apparatus according to claim 9, wherein the tuning element comprises a capacitor.

13. Apparatus according to claim 10, wherein the tuning element comprises a capacitor in parallel with the inductor.

14. Apparatus according to claim 13, wherein the capacitor and inductor form a resonant circuit tuned to a frequency approximately 1.2 times the third order harmonic of the fundamental ac line frequency.

15. Apparatus according to claim 9, wherein the ac shunt means comprises a capacitor.

16. Apparatus according to claim 9, wherein the power factor correction element comprises an inductor and the ac shunt means comprises a capacitor, the inductor and capacitor forming a low-pass filter circuit for reducing third order and higher harmonics of the fundamental ac line frequency.

17. Apparatus according to claim 9, further comprising current source means operatively connected to the ac shunt means for providing a source of ac current when the ac input lines are connected to a source of ac power.

18. Apparatus according to claim 17, wherein the current source means comprises a pair of anti-parallel diodes in series with the ac shunt means.

* * * * *